US 6,704,834 B1

(12) United States Patent
Demeure et al.

(10) Patent No.: US 6,704,834 B1
(45) Date of Patent: Mar. 9, 2004

(54) MEMORY WITH VECTORIAL ACCESS

(75) Inventors: Alain Demeure, Nice (FR); Didier Tomasini, Auribeau sur Siagne (FR)

(73) Assignee: Thomson Marconi Sonar, S.A.S., Sophia Antipolis (FR)

( * ) Notice: Subject to any disclaimer, the term of this patent is extended or adjusted under 35 U.S.C. 154(b) by 0 days.

(21) Appl. No.: 09/830,667

(22) PCT Filed: Oct. 22, 1999

(86) PCT No.: PCT/FR99/02578
§ 371 (c)(1),
(2), (4) Date: Apr. 30, 2001

(87) PCT Pub. No.: WO00/26790
PCT Pub. Date: May 11, 2000

(30) Foreign Application Priority Data

Oct. 30, 1998 (FR) .............................. 98 13664

(51) Int. Cl.[7] .............................. G06F 12/00
(52) U.S. Cl. ...................... 711/5; 711/202; 711/217
(58) Field of Search ................ 711/157, 165, 711/202, 217, 219, 5; 712/2, 14, 22

(56) References Cited

U.S. PATENT DOCUMENTS

| | | |
|---|---|---|
| 4,542,455 A | 9/1985 | Demeure |
| 4,604,736 A | 8/1986 | Demeure |
| 5,394,553 A * | 2/1995 | Lee .............................. 712/14 |
| 6,020,896 A | 2/2000 | Demeure et al. |
| 6,160,500 A | 12/2000 | Demeure |

OTHER PUBLICATIONS

De–Lei Lee, IEEE Transactions on Computers, vol. 41, No. 4, pp. 499–505, "Architecture of an Array Processor Using a Nonlinear Skewing Scheme", Apr. 1992.
Roger C. Swanson, IEEE Transactions on Computers, vol. C–23, No. 11, pp. 1105–1115, "Interconnections for Parallel Memories to Unscramble p–Ordered Vectors", Nov. 1974.
André Seznec, et al., Proceedings of The Annual International Symposium on Computer Architecture, pp. 341–350, "Odd Memory Systems May Be Quite Interesting", May 16, 1993.
IBM Technical Disclosure Bulletin, vol. 30, No. 9, pp. 226–229, "Residue Generator for an Address Mapping System for a Memory with a Prime Number Stride Capability", Feb. 1988.

* cited by examiner

Primary Examiner—Matthew Kim
Assistant Examiner—Woo H. Choi
(74) Attorney, Agent, or Firm—Oblon, Spivak, McClelland, Maier & Neustadt, P.C.

(57) ABSTRACT

A parallel memory configured to enable access to a table with aligned and equidistant components constituting a vector of N components. The memory (1) is organized as M memory banks (8). Each memory bank (8) includes an address calculator. The memory (1) also includes a unidirectional network (6) configured to carry out a permutation of the N components of the vector being accessed and to carry out a translation by a specified value t of the components of the vector.

14 Claims, 8 Drawing Sheets

| P ORDERING | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| P1 1st LAYER | 1 | 2 | 5 | 4 | 5 | 10 | 4 | 5 | 1 | 10 | 4 | 1 | 4 | 5 | 2 | 10 | 2 | 2 | 1 | 1 | 10 | 5 |
| P2 2nd LAYER | 1 | 1 | 19 | 1 | 1 | 19 | 19 | 20 | 9 | 1 | 20 | 12 | 9 | 12 | 19 | 20 | 20 | 9 | 19 | 20 | 9 | 9 |
| MODE p1 | a | c | b | e | b | d | e | b | a | d | e | a | e | b | c | d | c | c | a | a | d | b |
| MODE p2 | A | A | D | A | A | D | D | B | C | A | B | B | B | E | D | B | B | C | D | B | C | C |

FIG.7

| TRANSLATION $t$ | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| $t1$ 1st LAYER | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 |
| $t2$ 2nd LAYER | 0 | 0 | 0 | 0 | 0 | 5 | 5 | 5 | 5 | 5 | 10 | 10 | 10 | 10 | 10 | 15 | 15 | 15 | 15 | 15 | 20 | 20 | 20 |
| MODE $t1$ | a | b | c | d | e | a | b | c | d | e | a | b | c | d | e | a | b | c | d | e | a | b | c |
| MODE $t2$ | A | A | A | A | A | B | B | B | B | B | C | C | C | C | C | D | D | D | D | D | E | E | E |

FIG.8

MEMORY WITH VECTORIAL ACCESS

BACKGROUND OF THE INVENTION

1. Field of the Invention

The field of the invention is that of parallel memories which constitute an interesting approach for adapting the memory throughput to the computational power which can be installed nowadays on an integrated circuit.

2. Background of the Invention

A parallel memory is a memory which is capable of reading or writing from or to several memory slots in a single access cycle. A Single Instruction Multiple Data (SIMD) is a conventional device that uses parallel memory which can be accessed by all of a device's elementary processors. A SIMD eliminates the need for communication between a device's elementary processors, thereby greatly simplifying the manner of operation and appreciably enhancing the performance of device as compared to a device not equipped with a SIMD.

SIMD machines are mainly used generally to process data organized in tables and in particular for signal processing. Since they execute the same instruction in the same cycle, the elementary processors of an SIMD machine must access aligned and equidistant data components within a single table. These data components may constitute a vector, thereby prompting the name "vectorial access memory." When processing data, it may be necessary to access vectors with a predetermined orientation with respect to the axes of the single table, or which are, at the very least, parallel to any axis of this table. Likewise, any number of components of the table can separate two successively considered components in the vector. These constraints mean that a vectorial access memory cannot be constructed simply by juxtaposing blocks of RAM memory, the abbreviation standing for the expression "Random Access Memory". These constraints make it necessary to choose the number of banks carefully and to have address calculators which obey particular rules of installation of the tables in memory. Finally, these constraints require functions for reorganizing components of the vector intervening before writing or after reading to or from the banks.

R. C. Swanson in his article "Interconnections for parallel memories to unscramble pordered vectors" published under the reference IEEE Transactions on computers, vol. C-23, No. 11, November 1974, presents in section II an SIMD calculator model implementing a parallel memory. Swanson shows examples of installing 2D tables in this memory. Swanson also gives a definition of p-ordered vectors and indicates the advantage of flexibility afforded by a prime number of memory banks. Swanson also addresses a vector reordering problem and proposes networks that make it possible to reorder a vector. Swanson does not, however, indicate how to produce a parallel memory. In particular, Swanson does describe howthe addresses applied to the banks are to be calculated. Swanson also only discloses an installation of tables limited to two dimensions so that the proposed network requires that the elements of the reordered vector undergo an excessively complicated process of multiple routings dependent on the initial p-ordering thereof.

SUMMARY OF INVENTION

To provide a more efficient and capable memory access device, the invention proposes an embodiment of a memory with vector access. Accordingly, the subject of the invention is a data memory for data organized as tables, whose structure allows accesses via vectors of N components, and which is addressed according to a specified base of a residue number system, characterized in that it is organized as M memory banks of K slots, each bank, numbered between 0 and M−1, comprising an address calculator for calculating the local address in the relevant bank of a component i of the vector being accessed and in that it comprises a unidirectional network carrying out a permutation of the components of the vector being accessed which consists, either in going from an n-ordered vector to a 1-ordered vector, or in going from a 1-ordered vector to an n-ordered vector, this network furthermore carrying out a translation by a specified value t of the components of the vector being accessed. A memory according to the invention is structured as several banks. The management of the memory locations, such as is allowed by the address calculator of each bank associated with the network for permuting the components of the vectors, is carried out in such a way as to optimize accesses to the memory so as to increase the throughput thereof. The network comprises a number of layers and a number of modes of operation per layer which are determined as a function of a compromise between speed and simplicity. Speed is not compatible with a high number of layers. Simplicity requires a restricted number of modes of operation.

LIST OF FIGURES

Particular characteristics and advantages of the invention will become apparent with the aid of the description which follows in conjunction with the following drawings:

FIG. 1 describes the general organization of the data paths of a memory according to one embodiment of the invention, FIG. 2 describes a correspondence between a physical structure and a functional structure of a memory, FIG. 3 describes the addressing of the memory banks, FIG. 4 describes a calculation block of an address calculator, FIG. 5 describes a first set of layers of a network of a memory according to the invention, FIG. 6 describes a second set of layers of the network, FIG. 7 describes a table of correspondence between ordering stride p and modes-of operation of the layers of the first set of layers, and FIG. 8 describes a table of correspondence between translation value t and mode of operation of the layers of the second set of layers.

DESCRIPTION OF THE INVENTION

Throughout the document, the terms modulo and 5 mod are entirely identical.

Figure 1:
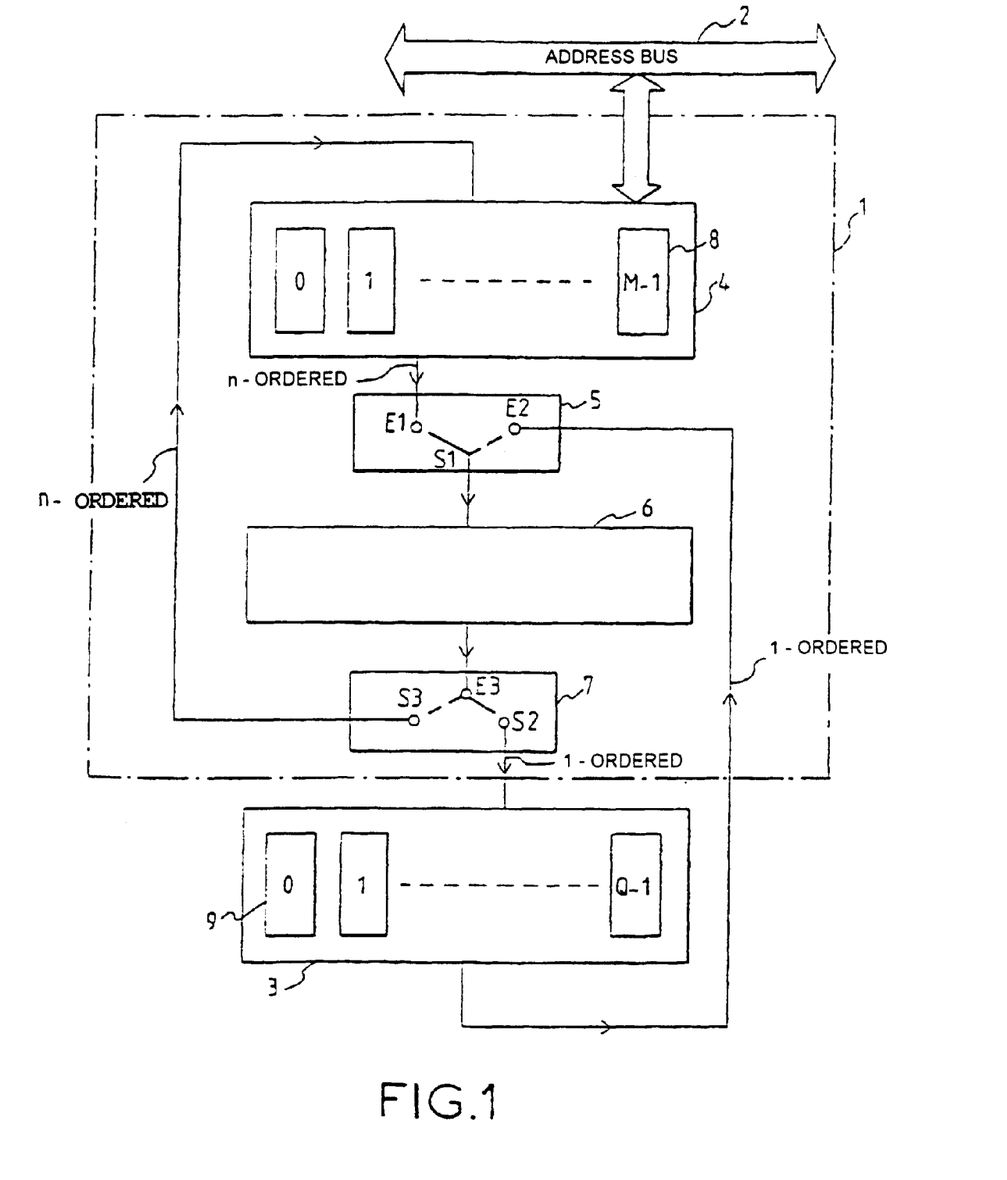

FIG. 1 diagrammatically represents the general organization of the data paths of a memory 1 according to the invention addressed by way of an address bus 2 and linked to a calculator 3. The memory 1 comprises a storage block 4, a first switch 5, a network 6 and a second switch 7. The storage block 4 comprises M memory banks 8 labeled from 0 to M−1. The first switch 5 has two input data buses, E1 and E2, and an output data bus S1. The first switch 5 links one of the two input data buses, E1 or E2, with the output data bus S1. The network 6 is unidirectional. It is composed of sets of layers. Each layer operates according to a specified mode of operation determined from among various modes of operation. The second switch 7 has an input data bus E3 and two output data buses, S2 and S3. The second switch 7 links the input data bus E3 with one of the two output data buses, S2 or S3. The calculator 3 comprises Q elementary processors 9 labeled from 0 to Q−1, an input data bus and an output data bus.

The output data bus of the storage block 4 is connected to the input data bus E1 of the first switch 5.

The output data bus S1 of the first switch 5 is connected to the input data bus of the network 6.

The output data bus of the network 6 is connected to the input data bus E3 of the second switch 7.

The output data bus S2 of the second switch 7 is connected to the input data bus of the calculator 3. The output data bus S3 of the second switch 7 is connected to the input data bus of the storage block 4.

The output data bus of the calculator 3 is connected to the input data bus E2 of the first switch 5.

Physically the memory consists of M banks, each labeled by an index m with $0 \leq m < M$. Each bank consists of K memory slots, each labeled in its bank by an index k with $0 \leq k < K$. The physical structure of the memory therefore corresponds to a 2D table, 2D being the abbreviation for two dimensions, herein referred to as MP, having a "Bank" dimension of size M, a "slot" dimension of size K, containing M×K elements; M×K also being the total capacity of the memory. An element of this 2D table is labeled by two indices: m,k. Let MP(m,k) be such an element.

Functionally the memory is regarded as a linear space, that is to say a 1D table, 1D being the abbreviation for one dimension, referred to hereinbelow as MF of M×K elements, each labeled by an index: @L with $0 \leq @L < M \times K$. Let MF(@L) be such an element.

Figure 2:
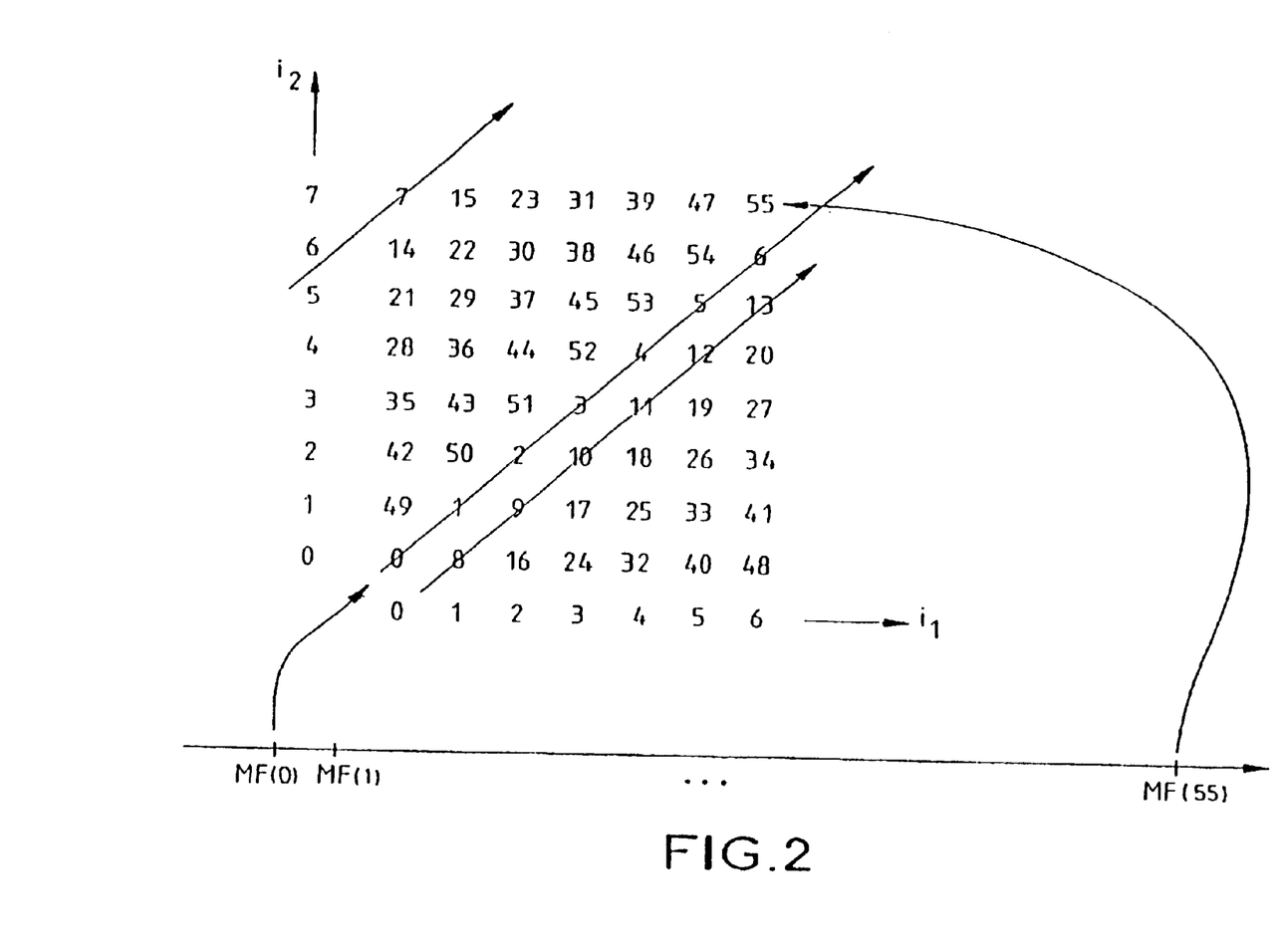

FIG. 2 illustrates the distribution along the diagonals of the elements of MF over the elements of MP: MF(0)→MP(0,0), MF(1)→MP(1,1), . . . , MF(54)→MP (5,6), MF(55)→MP (6,7).

A diagonal is resumed each time it exits on the right, respectively at the top, in the leftmost column of the table MP but one row higher up, respectively in the lowest row but one column further to the right. If M and K are relatively prime, it is known to the person skilled in the art:

that MF(M×K−1)→MP(M−1,K−1); in the case of the example adopted and represented in FIG. 2 this correspondence corresponds to MF(7×8−1)=MF(55)→MP (7−1,8−1)=MP(6,7), this actually being the case, that to each element of MP(m,k) there is distributed one and only one element of MF: MF(@L) with m=(@L)(modM) and k=(@L)(modK).

Stated otherwise, the indices m and k of the element of MP over which the element of MF of index @L is distributed, correspond to the expression of @L in a residue number system, denoted by the abbreviation RNS, whose base is (M,K). The residue number system, RNS, is a system known to the person skilled in the art and in particular from the book by Szabo and Tanaka "Residue Arithmetic and its Applications to Computer Technology", Mc GRAW-HILL BOOK COMPANY 1967. A number x expressed in RNS according to a base (X, Y) equals, the residual value obtained modulo X, the residual value obtained modulo Y. For example 25 equals 4,1 to the base (7,8), since 25 modulo 7 equals 4 and 25 modulo 8 equals 1.

The memory which corresponds to the illustration of FIG. 2 is addressed in an RNS system with base (7, 8). The maximum number of elements which can be addressed is 56, i.e. 7×8. These elements are numbered from 0 to 55. During a memory write or read of a vector, it is necessary to know the address of the components of the vector.

Figure 3:
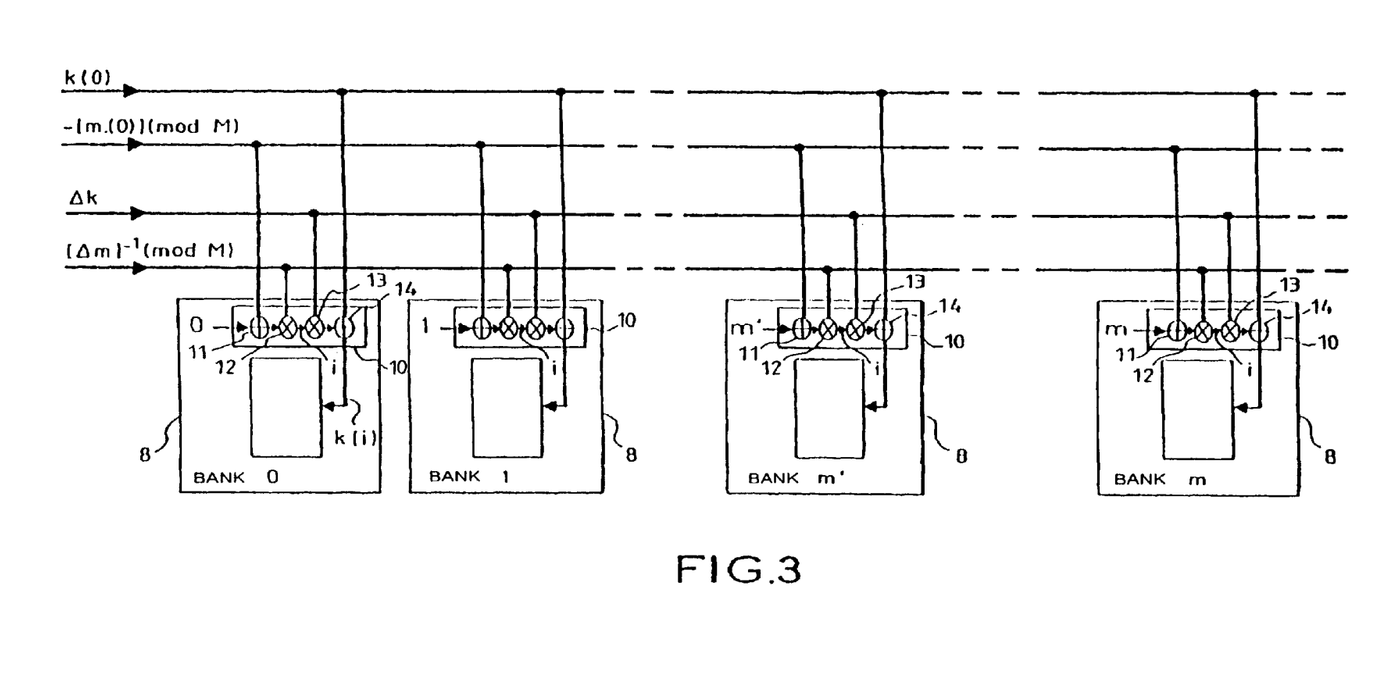

In a memory according to the invention, each memory bank comprises an address calculator 10 as illustrated by FIG. 3.

The memory makes it possible to read or write in a single clock cycle M components of a vector being accessed. A vector has an origin which is labeled by the indices m(0) and k(0) such that $$m(0)=@L(0)(\text{mod } M);$$

and $$k(0)=@L(0)(\text{mod } K).$$

The components of the vector are regularly distributed, according to constant index increments [Δm] (mod M) and [Δk] (mod K)in the memory banks on account of the distribution as described previously with regard to FIG. 2. [Δm] is the increment in the bank dimension and [Δk] is the increment in the slot dimension. Consider a component i of the vector to be read or written, it is labeled in memory by the indices m(i) and k(i) such that:

$$m(i)=[m(0)+i\times[\Delta m](\text{mod} M)](\text{mod} M); \quad (1)$$

and $$k(i)=[k(0)+i\times[\Delta k](\text{mod} K)](\text{mod} K) \quad (2)$$

where m(i) corresponds to the number of the bank in which component i of the vector is located and k(i) corresponds to the number of the slot of the bank m(i) in which this component i is located.

During memory access, each bank receives as parameters the values:

[m(0)](modm), k(0), Δk and [Δm]$^{-1}$(modM) with:
[−m(0)](modM) the additive inverse of m(0) modulo M satisfying the relation m(0)+[−m(0)]=0(modM);
[Δm]$^{-1}$(modM)the inverse of Am modulo M satisfying the relation Δm×[Δm]$^{-1}$=1(modM).

The address calculator of bank m determines the value i of the component which it contains by extracting i from relation (1):

$$i=[[m(i)+-[m(0)](\text{mod}M)](\text{mod}M)\times[(\Delta m)]^{-1}(\text{mod}M)I(\text{mod}M) \quad (3)$$

The address calculator 10 comprises a first adder 11 and a first multiplier 12. The first adder 11 adds together the number m(i) of the bank of the component i of the vector and the additive inverse, modulo M, of the number m(0) of the bank of the origin of the vector. The number m(i) of the bank of the component i has a value m, the number m (0) of the bank of the origin has a value 0. The result of the addition is multiplied by the first multiplier 12 with the inverse, modulo M, of the increment in the bank dimension (Am). The result of the multiplication gives the value i of the component of the vector contained in bank m.

Figure 4:
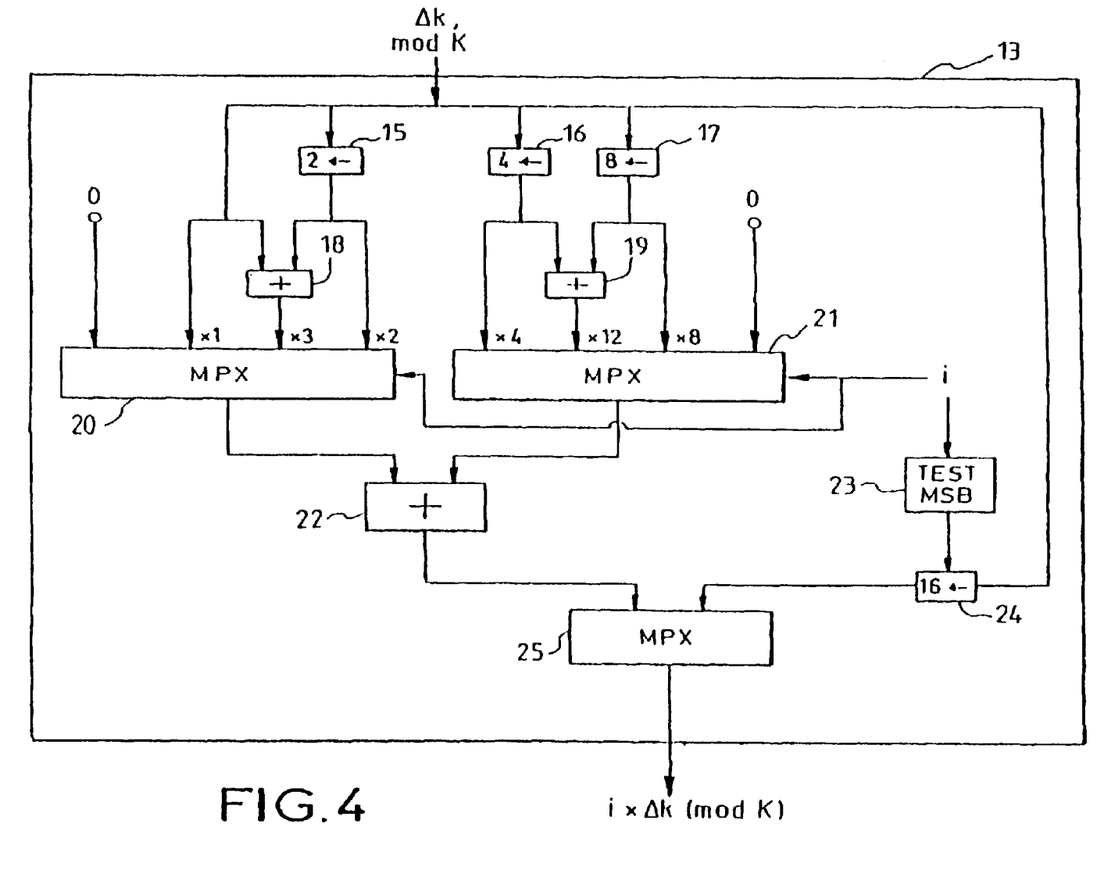

Knowing i, and knowing the parameter Δk which the bank receives from a block outside the memory, for example a compiler, the address calculator calculates product i×Δk (modK) with the aid of a calculation block 13. An exemplary embodiment of a calculation block 13 is represented in FIG. 4. It does not include any multipliers. Three calculation blocks 15, 16 and 17 carry out the multiplications by 2, 4 or 8 without multipliers by leftward shifting by one, two or three bits. Next, three adders 18, 19 and 22 carry out all the multiplications from 0 to 15; the multiplication by 16 being achieved separately by a test 23 of i on the most significant bit followed by a leftward shift by 4 bits. The choosing of the correct value is done by three multiplexers 20, 21, 25 controlled by the value of i.

The data exchanged between the memory and the calculator are structured in the form of vectors of N components.

The vectors stored in the M memory banks are ordered according to an order n and are said to be n-ordered.

A vector is said to be n-ordered or of order n when its N components are regularly spaced by a value equal to n. For example, for a 3-ordered vector of 8 components, the components of the vector are held in the following order: 0,3,6,1,4,7,2,5; each component being identified by its number which varies from 0 to 7. The origin 0 of the vector is held in a bank which is not necessarily bank 0. The set of components of the vector can be afforded a shift d. Under these conditions the origin 0 of the vector is stored in bank d. Going back to the previous example and considering the shift d=2, the components of the vector are stored in the storage block in the following order: 2,5,0,3,6,1,4,7.

The vectors processed by the calculator are 1-ordered, the component i of a vector is processed by the elementary processor i. In particular, the origin 0 of the vector is processed by elementary processor 0.

When the calculator makes a read access to the memory the first switch links the input data bus E1 with the output data bus S1 and the second switch links the input data bus E3 with the output data bus S2.

When the calculator makes a write access to the memory, the first switch links the input data bus E2 with the output data bus S1 and the second switch links the input data bus E3 with the output data bus S3.

During a read access to the memory, the vector at the input of the network is n-ordered with its components shifted by a value d, and the vector at the output of the network is 1-ordered and exhibits no shift.

During a write access to the memory, the vector of the input of the network is 1-ordered and exhibits no shift and the vector at the output of the network is n-ordered and its components are shifted by a value d.

To carry out the permutation and translation of the components of the vector, the unidirectional network is structured as two sets of layers. A first set of layers carries out the permutation of the components of the vector so as to transform the n-ordered vector into a 1-ordered vector or conversely so as to transform the 1-ordered vector into an n-ordered vector. Each layer comprises several modes of operation. The value p, defined as the ordering stride, determines the mode of operation to be used per layer. A second set of layers carries out the translation of the components of the vector so as to align the origin of the vector on the elementary processor 0 in the case of a memory read or so as to shift the origin of the vector in the case of a memory write. Each layer comprises several modes of operation. The value t, defined as the translation value, determines the mode of operation to be used per layer.

Figure 5:
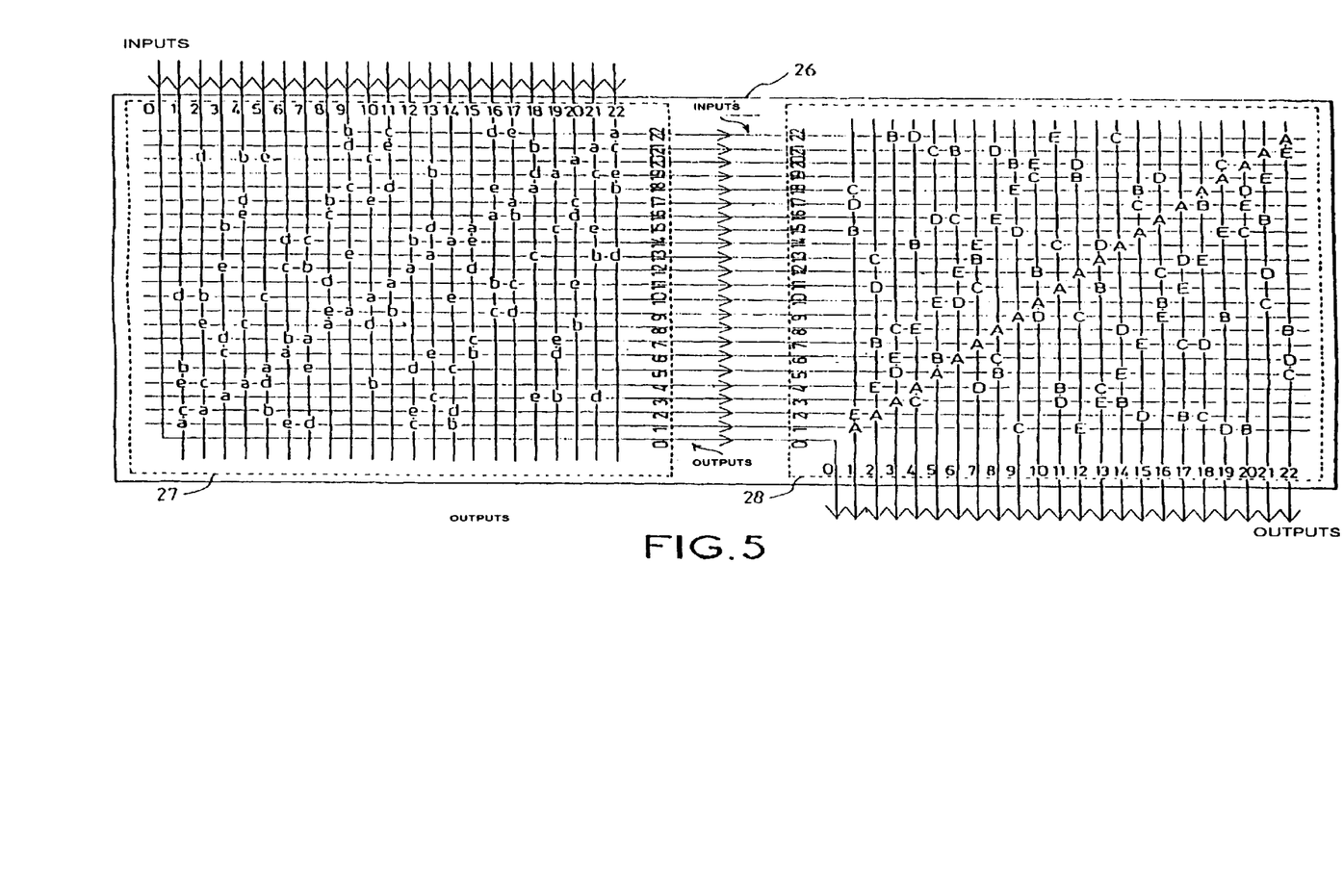
Figure 6:
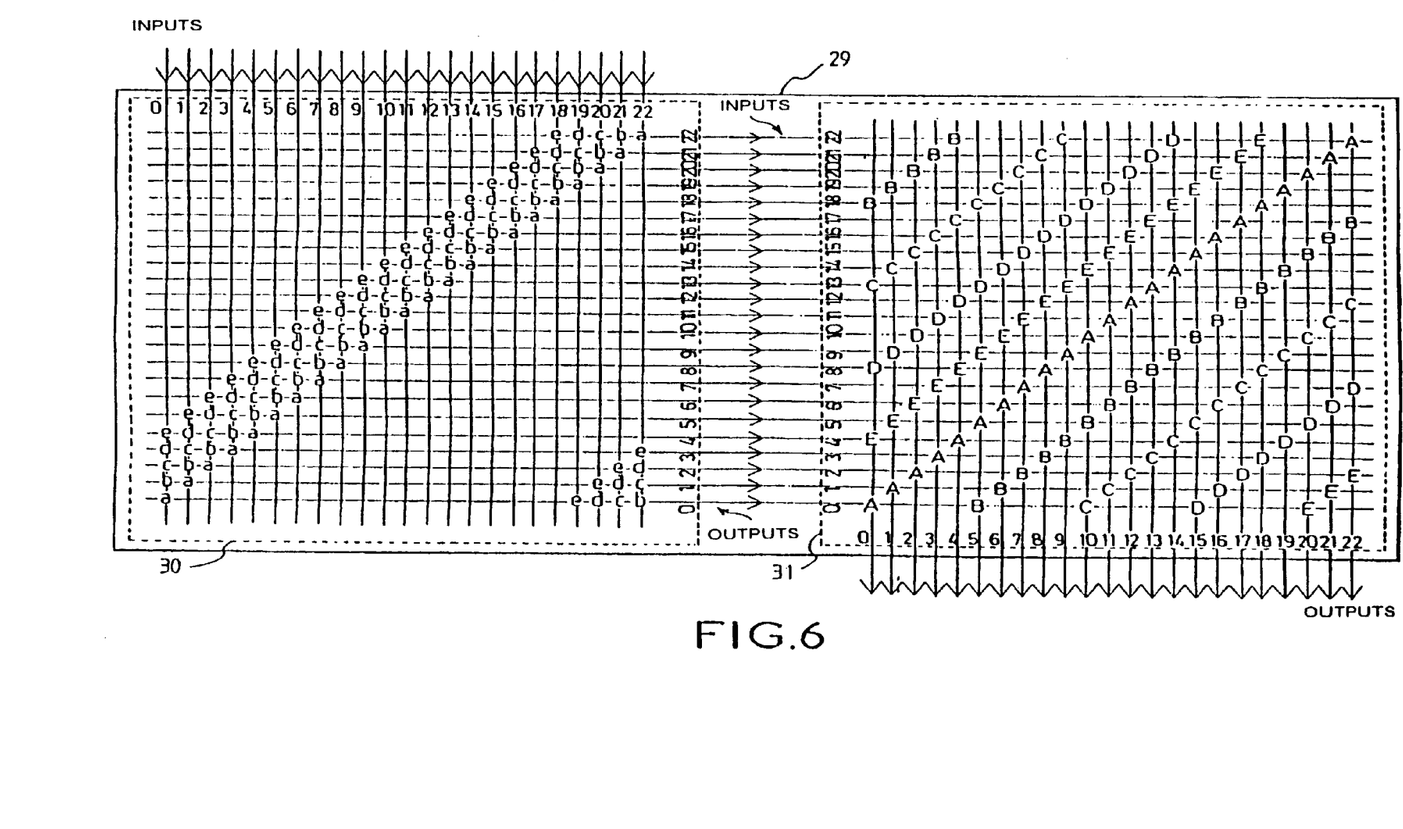
Figure 7:
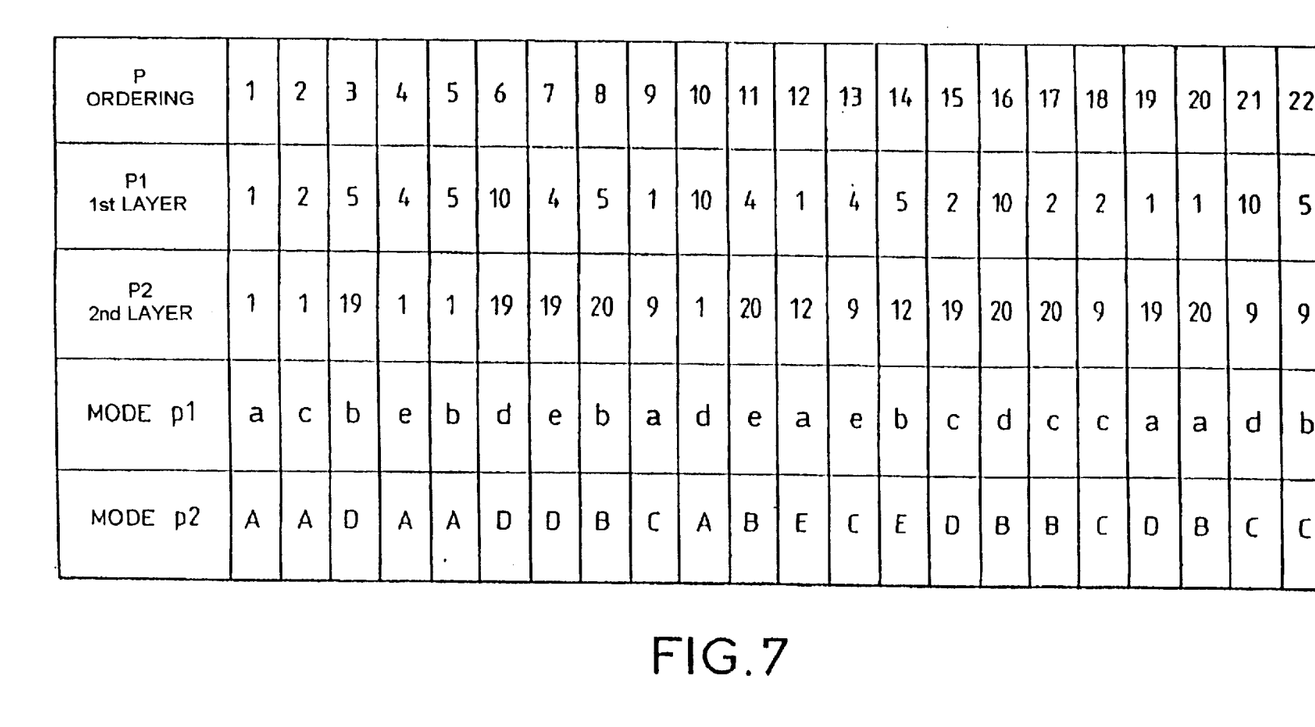
Figure 8:
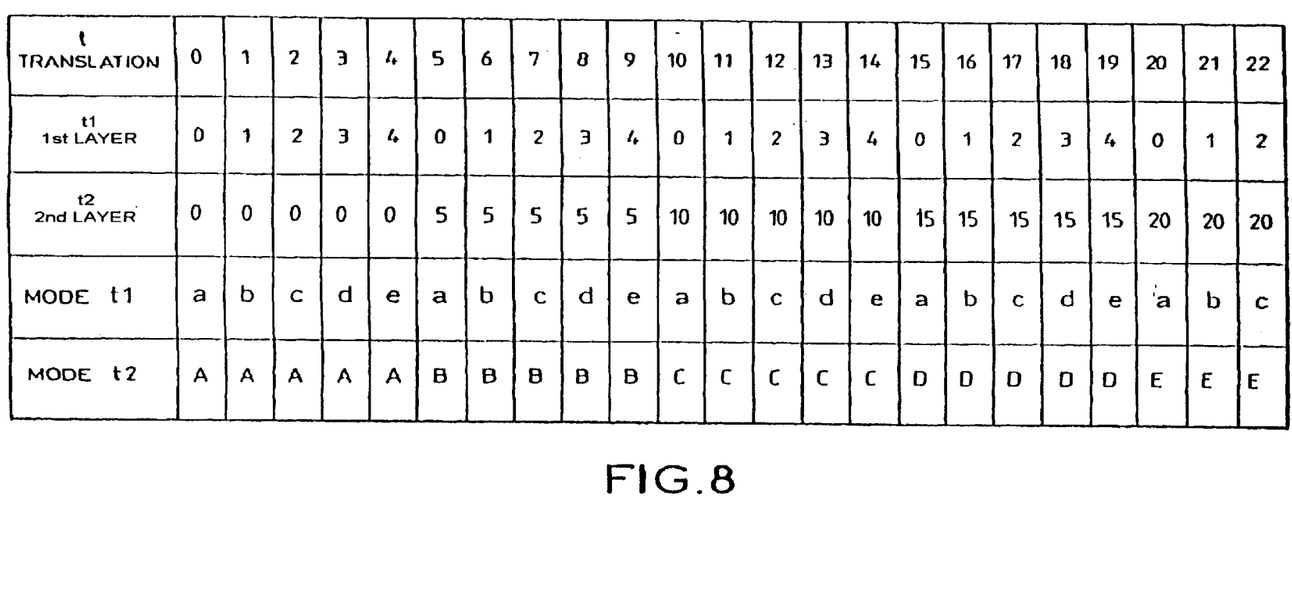

FIGS. 5, 6, 7 and 8 describe exemplary embodiments of the network. FIG. 5 diagrammatically shows the first set of layers. FIG. 6 diagrammatically shows the second set of layers. FIG. 7 indicates the modes of operation to be used as a function of the ordering stride p. FIG. 8 indicates the modes of operation to be used as a function of the translation value t.

The embodiment of the network illustrated by FIGS. 5 and 6 includes a first set of layers 26 composed of two layers 27 and 28 and a second set of layers 29 composed of two layers 30 and 31. The first layer 27 of the first set of layers 26 exhibits five different modes of operation, denoted a, b, c, d and e. The second layer 28 of the first set of layers 26 exhibits five different modes of operation, denoted A, B, C, D and E. The first layer 30 and the second layer 31 of the second set of layers 29 also exhibit five modes of operation denoted a, b, c, d, e and A, B, C, D, E respectively.

The first table, FIG. 7, makes it possible to determine the mode of operation of each of the two layers of the first set. The second table, FIG. 8, makes it possible to determine the mode of operation of each of the two layers of the second set.

The operation of the network is illustrated hereinbelow by taking as example, firstly a memory write of an initially 1-ordered vector stored in the form of a 3-ordered vector with a shift of 7, and subsequently a memory read of a 3-ordered vector shifted by 7.

In the case of the memory write, the determination of the ordering value p and translation value t is immediate. The vector stored must be 3-ordered, consequently p=3. The components of the stored vector must be shifted by 7, consequently t=7. The 30 values of p and t are given directly by the order and the shift of the vector.

The ordering value p and translation value t make it possible to determine the modes of operation of the layers of the network.

The table of FIG. 7 makes it possible to determine for the first set the mode of operation of the first layer, mode p1=b, and the mode of operation of the second layer, mode p2=D, given that p=3.

On input to the network the vector is 1-ordered and its components are not shifted. The components of a vector are input to the first layer in the following order:

0,1,2,3,4,5,6,7,8, . . . 22.

On crossing the first layer, the components of the vector are permuted. The mode of operation of the first layer is determined by the letter b which corresponds to the mode p1 selected. The manner of operation is detailed hereinbelow with regard to FIG. 5.

The first component 0 undergoes no permutation. Indeed, on the vertical line which starts from 0, in the grid of the first layer, no mode letter appears. The second component 1 undergoes a permutation. Indeed, the vertical line which starts from 1 contains the letter b which corresponds to the mode p1 adopted. The letter b determines the horizontal line on which the second component exits, in this case line 5. The third component 2 exits on the horizontal line 10 determined by the letter b positioned on the vertical line which starts from the input of the third component. And so on and so forth, until the twenty-third component 22 which exits on the horizontal line 18.

On exit from the first layer, the components of the vector are in the following order:

0, 14, 5, 19, 10, 1, 15, 6, 20, 11, 2, 16, 7, 21, 12, 3, 17, 8, 22, 13, 4, 18, 9.

On entry to the second layer, the components of the vector are in the same order as they are on exit from the first layer, that is to say:

0, 14, 5, 19, 10, 1, 15, 6, 20, 11, 2, 16, 7, 21, 12, 3, 17, 8, 22, 13, 4, 18, 9.

The second layer carries out a permutation of the vector components present on its inputs according to an operation similar to that of the first layer. The mode of operation is specific to the layer and is determined in the example adopted by the letter D which corresponds to the mode p2 selected. The operation is detailed hereinbelow with regard to FIG. 5.

The first component 0 undergoes no permutation. Indeed, on the horizontal line which starts from 0, in the grid of the second layer, no mode letter appears. The second component 14 undergoes a permutation. Indeed, the horizontal line which starts from 1 contains the letter D which corresponds to the mode p2 adopted. The letter D determines the vertical line on which the second component exits, in this case line 19. The third component 5 exits on the vertical line 15 determined by the letter D positioned on the horizontal line which starts from the input of the third component. And so on and so forth, until the twenty-third component 9 which exits on the vertical line 4.

Thus, on exit from the second layer, the components of the vector are in the following order:

0, 8, 16, 1, 9, 17, 2, 10, 18, 3, 11, 19, 4, 12, 20, 5, 13, 21, 6, 14, 22, 7, 15.

After permutation of its components by the first set of layers, the vector has its components shifted by the second set of layers. The table of FIG. 8 makes it possible to determine for the second set of layers the mode of operation of the first layer, mode t1=c, and the mode of operation of the second layer, mode t2=B, given that t=7.

On entry to the first layer of the second set of layers of the network, the vector of the example has its components 3-ordered. The components of the vector are thus in the following order:

0, 8, 16, 1, 9, 17, 2, 10, 18, 3, 11, 19, 4, 12, 20, 5, 13, 21, 6, 14, 22, 7, 15.

FIG. 6 makes it possible to determine the order of the components of the vector on exit from the first layer of the second set of layers, then on exit from the network which corresponds to the output of the second layer of the second set of layers.

The first layer operates according to the mode t1 equal to c. The operation is detailed hereinbelow with regard to FIG. 6.

The first component 0 undergoes a shift 2. Indeed, the vertical line which starts from 0, in the grid of the first layer, contains the letter c which corresponds to the mode d1 adopted. The letter c determines the horizontal line on which the first component 0 exits in this case line 2. The second component 8 undergoes the same shift as the first component 0. Indeed, the grid of the first layer exhibits each mode d1, in the example adopted c, along a diagonal. And so on and so forth until the diagonal, which contains the letter of the mode d1, exits the grid. For the next component, in the example the twenty-second component, the diagonal starts again from the intersection between the vertical line situated below this last component and the horizontal line corresponding to the output 0 of the first layer. The twenty-second component 7 thus exits on the line 0. And so on and so forth until the twenty-third component 15 which exits on the horizontal line 1.

On exit from the first layer the components of the vector are in the following order:

7, 15, 0, 8, 16, 1, 9, 17, 2, 10, 18, 3, 11, 19, 4, 12, 20, 5, 13, 21, 6, 14, 22.

On entry to the second layer, the components of the vector are in the same order as they are on exit from the first layer. That is to say:

7, 15, 0, 8, 16, 1, 9, 17, 2, 10, 18, 3, 11, 19, 4, 12, 20, 5, 13, 21, 6, 14, 22.

The second layer carries out a translation of the vector components present on its inputs according to an operation similar to that of the first layer. The mode of operation is specific to the layer and is determined in the example adopted by the letter B which corresponds to the mode t2 selected. The operation is detailed hereinbelow with regard to FIG. 6.

The first component 7 undergoes a shift of 5. Indeed, the horizontal line which starts from 0, in the grid of the second layer, contains the letter B which corresponds to the mode t2 adopted. The letter B determines the vertical line on which the first component 7 exits in this case line 5. The second component 15 undergoes the same shift as the first component. Indeed, the grid of the second layer exhibits each mode t2, in the example adopted B, along a diagonal. And so on and so forth until the diagonal, which contains the letter of the grid the mode t2, exits the grid. When the diagonal exits the grid via a horizontal line, it is then continued by starting from the point of intersection between the vertical line, the first line to the right of the letter of the mode t2 furthest to the right, and the horizontal line corresponding to the input 0. When the diagonal exits the grid via a vertical line, it is then continued by starting from the point of intersection between the horizontal line, the first line above the letter of the mode t2 furthest to the right, and the vertical line corresponding to the output 0. In the example adopted the diagonal which contains the mode t2=B exits the grid on a vertical line. The eighteenth component 5 exits on the line 22. The diagonal starts again at the intersection between the horizontal line 18, the first line above the horizontal line corresponding to the eighteenth component, and the vertical line corresponding to the output 0. The nineteenth component 13 thus exits on the line 0. And so on and so forth until the twenty-third component 22 which exits on the vertical line 4. Thus, on exit from the second layer, the components of the vector are in the following order:

13, 21, 6, 14, 22, 7, 15, 0, 8, 16, 1, 9, 17, 2, 10, 18, 3, 11, 19, 4, 12, 20, 5.

Table 1 of appendix 1 groups together the various forms taken by the previous vector in the course of the layers of the network. The output of the second layer of the second set of layers corresponds to the output of the network. It is easy to note that the origin 0 of the vector is actually shifted by a value 7 and that the components of the vector are actually 3-ordered; component 1 being at the location 7+3=10, component 2 at the location 10+3=13 and so on modulo 23. Component 6 is thus at the location [7+3×6] (mod23)=2.

Subsequently, the example envisaged corresponds to a memory read of a vector whose components are 3-ordered and whose origin is stored in the memory bank 7.

In the case of the memory read, the determination of the ordering value p and translation value t is not immediate.

The ordering value p is obtained by calculating the inverse, modulo the number N of components of the vector, of the order of the vector read.

$$p = \text{orders}^{-1}(\text{mod} N) \quad (4)$$

In the case of the example, relation (4) gives:

p=3$^{-1}$(mod23)=8 indeed 3×8=24=1(mod23). The translation value t is obtained by solving the following equation:

$$\text{location } (0) + \text{order} \times t = 0 (\text{mod} N) \text{ with:} \quad (5)$$

location (0), the value of the location which corresponds to the bank No. where the origin of the vector read is located, order, the value according to which the components of the vector read are ordered. Solving equation (5) in the case of the example gives:

t=13 indeed 7+3×13=46=2×23=0(mod23).

The use of the network is entirely identical whether dealing with a writing of an initially 1-ordered vector whose origin is aligned on the elementary processor 0 and which is to be stored in the form of an n-ordered vector whose origin is to be aligned on a bank m or whether dealing with a reading of an initially n-ordered vector whose origin is stored in a bank m and which is to be processed by the elementary processors in the form of a 1-ordered vector whose origin is aligned on the elementary processor 0. The difference between writing and reading lies in the various modes of operation of the layers of the network.

Thus, returning to the example which firstly corresponds to a memory write, the modes of operation of the layers of the network are: mode p1=b, mode p2=D, mode t1=c, mode t2=B, and which subsequently corresponds to a memory read, the various modes of operation of the layers of the network are: mode p1=b, mode p2=B, mode t1=d and mode t2=C. These latter modes of operation are determined by virtue of the table of FIG. 7 given that p=8, and by virtue of the table of FIG. 8 given that t=13.

By utilizing FIGS. 5 and 6, knowing the modes of operation of the various layers of the network, it is possible to determine the various forms taken by the vector on exit from the various layers. The various forms of the vector of the example are grouped together in table 2 in appendix 2.

The output of the second layer of the second set of layers corresponds to the output of the network. It is easy to note that the origin 0 of the vector is at the location 0 and that the components of the vector are 1-ordered.

Another example is given hereinbelow so as to supplement the illustration given in the case of a memory read. The vector read in memory is 4-ordered and has an origin stored at location 7.

Relation (4) makes it possible to determine the ordering value p:

p=4$^{-1}$(mod23) i.e. p=6 since 4×6=24=1(mod23)

Relation (5) makes it possible to determine the value t of the shift:

7+4×t=0(mod23) i.e. t=4 since 7+4×4=23=0(mod23)

The table of FIG. 7 makes it possible to determine the modes of operation of the first set of layers: mode p1=d and mode p2=D given that p=6.

The table of FIG. 8 makes it possible to determine the modes of operation of the second set of layers: mode t1=e and mode t2=A given that t=4.

By utilizing FIGS. 5 and 6, knowing the modes of operation of the various layers of the network, it is possible to determine the various forms taken by the vector on exit from the various layers. The various forms of the vector of the example are grouped together in table 3 in appendix 3. The output of the second layer of the second set of layers corresponds to the output of the network. It is easy to note that the origin 0 of the vector is at the location 0 and that the components of the vector are 1-ordered.

What is claimed is:

1. A data memory configured to store data organized as tables, comprising:

M memory banks of K slots, the M memory banks numbered between 0 and M−1, addressed according to a specified base of a residue number system, and configured to allow access via equidistant vectors of N components, each of the M memory banks comprising an address calculator configured to calculate a local address of a component of a vector being accessed; and a unidirectional network configured to carry out a permutation of the components of the vector being accessed, said permutation comprising one of a permutation of going from an n-ordered vector to a 1-ordered vector and a permutation of going from a 1-ordered vector to an n-ordered vector, said unidirectional network configured to carry out a translation, by a specified value t, of the components of the vector being accessed.

2. The data memory as claimed in claim 1, wherein in order to calculate in a specified memory bank the local address of the component of a vector whose origin is stored in a memory bank numbered m(0), the address calculator of the specified memory bank comprises:

a calculator configured to successively determine a value i of the component of the vector contained in the specified memory bank by means of the following relation i=[[m(i)+[m(0)](modM)](modM)×[(Δm)]$^{-1}$(modM)](modM), wherein −[m(0)](modM), the additive inverse of m(0) modulo M, satisfies the relation m(0)+[−m(0)]=0(modM),

[(Δm)]$^{-1}$(modM)], the inverse of Δm modulo M, satisfies the relation Δm×[(Δm)]$^{-1}$=1(modM), Δm being the index increment with which the components of the vector are stored in the memory banks, the calculation of the local address satisfies the relationship k(i)=[k(0)+i×[Δk](modK)](modK), and ≠k being the index increment with which the components of the vector are stored in the memory slots and with k(0) being the number of the memory slot in which the origin of the vector is held.

3. The data memory as claimed in claim 1, wherein the unidirectional network comprises:

a first set of layers; and a second set of layers, said second set of layers arranged in series with the first set of two layers, wherein the first set of layers is organized to modify, by a value p, the spacing between successive components of a vector present at the input of the network so as to perform at least one of p-ordering of the 1-ordered components of the vector during a memory write and a 1-ordering of the p-ordered components of the vector during a memory read, and the second set of layers is organized to translate, by a value t, the successive components of the vector modified by the first set of layers said translation so as to perform at least one of a realignment of the origin of the vector during a memory read and a shift of the origin of the vector during a memory write.

4. The data memory as claimed in claim 1, further comprising:

a first switch comprising two inputs and an output; and a second switch comprising an input and two outputs, wherein the first and second switches are arranged so that the first switch connects the output of the M memory banks with the input of the unidirectional network and the second switch connects the output of the unidirectional network with the output of the M memory banks during a read access of the memory, and the first switch connects the input of the M memory banks with the input of the unidirectional network, and the second switch connects the output of the unidirectional network with the input of the M memory banks during a write access to the memory.

5. The data memory as claimed in claim 2, wherein the spacing value p, the translation value t, the index increment $\Delta m$, the index increment $\Delta k$, the number m(0), and the number k(0) each comprise:

data supplied to the memory during each read access and write access to the memory.

6. The data memory as claimed in claim 3, wherein the spacing value p, the translation value t, the index increment $\Delta m$, the index increment $\Delta k$, the number m(0) and the number k(0) each comprise:

data supplied to the memory during each read access and write access to the memory.

7. The data memory as claimed in claim 3, wherein the first set of layers and the second set of layers respectively comprise:

a first set of layers configured to operate according to one of a plurality of specified modes of operation determined by the spacing value p; and a second set of layers configured to operate according to one of a plurality of specified modes of operation determined by the translation value t.

8. The data memory as claimed in claim 5, wherein the first set of layers and the second set of layers respectively comprise:

a first set of layers configured to operate according to one of a plurality of specified modes of operation determined by the spacing value p; and a second set of layers configured to operate according to one of a plurality of specified modes of operation determined by the translation value t.

9. The data memory as claimed in claim 3, wherein each of the first and second set of layers comprises:

a predetermined number of layers, and a predetermined number of modes of operation, wherein said predetermined number of layers and said predetermined number of modes are parameterizable.

10. The data memory as claimed in claim 5, wherein each of the first and second set of layers comprises:

a predetermined number of layers, and a predetermined number of modes of operation, wherein said predetermined number of layers and said predetermined number of modes are parameterizable.

11. The data memory as claimed in claim 7, wherein each of the first and second set of layers comprises:

a predetermined number of layers, and a predetermined number of modes of operation, wherein said predetermined number of layers and said predetermined number of modes are parameterizable.

12. The data memory as claimed in claim 9, wherein each of the first set of layers and the second set of layers comprise:

a first and second layer, said first layer configured to correspond to a first set of five modes of operation and said second layer configured to correspond to a second set of five layers.

13. The data memory as claimed in claim 10, wherein each of the first set of layers and the second set of layers comprise:

a first and second layer, said first layer configured to correspond to a first set of five modes of operation and said second layer configured to correspond to a second set of five layers.

14. The data memory as claimed in claim 11, wherein each of the first set of layers and the second set of layers comprise:

a first and second layer, said first layer configured to correspond to a first set of five modes of operation and said second layer configured to correspond to a second set of five layers.

* * * * *